UNITED STATES PATENT OFFICE.

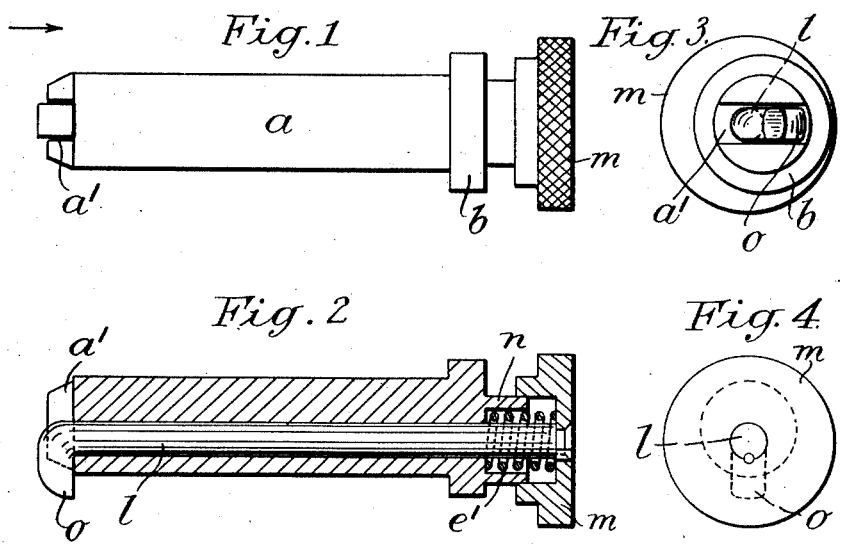

ERNEST MEPSTED, OF PENTONVILLE, LONDON, ENGLAND.

LOCKING OF REMOVABLE JOINT-PINS, HINGE-PINS, COUPLING-PINS, AND THE LIKE.

1,372,242.     Specification of Letters Patent.    Patented Mar. 22, 1921.

Application filed March 25, 1919. Serial No. 285,130.

*To all whom it may concern:*

Be it known that I, ERNEST MEPSTED, engineer, a subject of the King of Great Britain and Ireland, (whose post-office address is 32–34 Rodney street, Pentonville, London, N. 1, England,) have invented certain new and useful Improvements in the Locking of Removable Joint-Pins, Hinge-Pins, Coupling-Pins, and the like, of which the following is a specification.

This invention relates to the locking or securing of removable joint pins, hinge pins, coupling pins, fastening pins and the like employed to connect parts which require to be quickly separated or assembled and has for its object to provide a locking pin for the purpose aforesaid having positive locking means adapted when in the locking position to prevent the pin from working out or moving endwise, but permitting of the quick release and removal of the pin without the aid of tools.

According to this invention a movable member is mounted to slide axially on or in the pin at the head end thereof and pressed outward by a spring while a locking device is connected with said movable member and operated thereby to secure or release the pin.

In one form of construction the locking means is capable of being manipulated from the head end of the pin but effects the locking at the opposite end where a radial head, projection or stop forming the locking member proper can be caused to project at right angles to the shank of the pin to a sufficient extent to secure the pin in position or can be moved into an inoperative position so as to offer no obstruction to the withdrawal of the pin.

In the accompanying sheet of illustrative drawings:

Figures 1 and 2 are side elevation and longitudinal section respectively of a locking pin constructed according to this invention.

Figs. 3 and 4 are opposite end elevations of the same.

In the form of the invention is shown a cylindrical pin $a$ formed with a head $b$ at one end and a transverse groove $a'$ at the other end. The pin $a$ is bored eccentrically form end to end to receive a pin $l$ of a smaller diameter which is inserted in the bore and secured at one end in a circular head, milled cap, or socket piece $m$ arranged to fit and slide over an annular flange or socket $n$ on the head of the main pin and to coöperate therewith to inclose a helical compression spring $e'$ placed on the end of the eccentrically disposed pin $l$ between the head $b$ of the main pin and the cap or socket piece $m$.

A its opposite end the eccentrically mounted pin $l$ has an integral gib $o$ or similar head shaped to fit the transverse groove $a'$ in the adjacent end of the main pin in which it is normally held by the reaction of the compression spring $e'$ at the other end.

This gib $o$ or similar head forms the locking member proper, the transverse groove $a'$ in which it fits being so disposed across the end of the main pin and the radial dimension of the gib head being such that when set one way in the groove it projects a sufficient distance radially to lock the main pin as shown in Fig. 2 and when turned through an angle of one hundred and eighty degrees and set the opposite way in the groove it no longer projects radially from the main pin or locks it, this position corresponding with the maximum radial distance between the axis of the eccentric bore and the circumference of the main pin which is as great as or greater than the radial length of the locking head.

In order to change the positions of the locking member the head or cap with the eccentric pin $l$ is pressed inward against the spring $e'$ at the head end of the main pin to force the gib $o$ out of the groove $a'$ allowing the pin $l$ to be turned through the required angle.

I claim:

1. A pin with locking means as set forth comprising a spring pressed movable head mounted on an extension on the fixed head of the pin and a locking member secured to the movable head at one end and extending through an eccentric bore in the pin, its opposite end terminating in a radial locking head, located in a groove in the shank end of the pin and capable of being turned into a locking or release position substantially as described.

2. A pin locking device comprising a movable head mounted on one end of the pin, a locking member located in an eccentric bore in the pin and connected at one end with the movable head, a gib on the opposite end of the locking member, and means including a spring and a groove in the pin for retaining the gib in the locked or unlocked position.

ERNEST MEPSTED.